(12) United States Patent
Wen

(10) Patent No.: US 9,092,440 B1
(45) Date of Patent: Jul. 28, 2015

(54) GENERATING A TRANSLATION OF OPERATIONS FOR A DATA STRUCTURE

(75) Inventor: Jianjun Wen, San Jose, CA (US)

(73) Assignee: Google Inc., Mountain View, CA (US)

( * ) Notice: Subject to any disclaimer, the term of this patent is extended or adjusted under 35 U.S.C. 154(b) by 500 days.

(21) Appl. No.: 13/233,643

(22) Filed: Sep. 15, 2011

(51) Int. Cl.
*G06F 17/30* (2006.01)
*G06F 15/173* (2006.01)

(52) U.S. Cl.
CPC ........ *G06F 17/30067* (2013.01); *G06F 15/173* (2013.01)

(58) Field of Classification Search
CPC .......................... G06F 17/30067; G06F 15/173
See application file for complete search history.

(56) References Cited

U.S. PATENT DOCUMENTS

| | | | |
|---|---|---|---|
| 7,406,683 B2 | 7/2008 | Kalidindi et al. | |
| 7,590,975 B1 | 9/2009 | Shapiro | |
| 2009/0313613 A1* | 12/2009 | Ben-Artzi et al. | 717/137 |
| 2010/0010960 A1* | 1/2010 | Singh | 707/2 |
| 2010/0088686 A1* | 4/2010 | Langworthy et al. | 717/143 |

* cited by examiner

*Primary Examiner* — Tony Mahmoudi
*Assistant Examiner* — Tuan-Khanh Phan
(74) *Attorney, Agent, or Firm* — Fish & Richardson P.C.

(57) ABSTRACT

A method performed by one or more processing devices includes obtaining a definition of a data structure; obtaining a definition of one or more operations to be performed on the data structure, the definition of the one or more operations being in accordance with a first syntax; receiving a request for instructions to perform the one or more operations on the one or more fields of the data structure, the instructions being in accordance with a second syntax; generating a translation of the definition of the one or more operations from the first syntax to the second syntax; generating instructions for accessing the one or more fields of the data structure; and generating the instructions in accordance with the second syntax for performing the one or more operations on the one or more fields of the data structure.

21 Claims, 4 Drawing Sheets

GENERATING A TRANSLATION OF OPERATIONS FOR A DATA STRUCTURE

TECHNICAL FIELD

This disclosure relates generally to generating a translation of operations for a data structure.

BACKGROUND

A developer can write a computer program to perform operations on a data structure. Generally, an operation includes an action resulting from an instruction. In an example, the computer program is written in a programming language. In this example, the developer wants to use the operations in another computer program, which uses another, different programming language. To use the operations in the other programming language, the developer re-writes the operations in the other programming language.

SUMMARY

In one aspect of the present disclosure, a method performed by one or more processing devices includes obtaining a definition of a data structure, the definition specifying one or more fields of the data structure; obtaining a definition of one or more operations to be performed on the data structure, the definition of the one or more operations being in accordance with a first syntax; receiving a request for instructions to perform the one or more operations on the one or more fields of the data structure, the instructions being in accordance with a second syntax; generating a translation of the definition of the one or more operations from the first syntax to the second syntax; generating, in accordance with the second syntax based on the definition of the data structure, instructions for accessing the one or more fields of the data structure; and generating, at least partly based on the translation and the instructions for accessing the one or more fields of the data structure, the instructions in accordance with the second syntax for performing the one or more operations on the one or more fields of the data structure.

Implementations of the disclosure can include one or more of the following features. In some implementations, the method also includes generating, based on the definition of the data structure and the definition of one or more operations, a mapping specifying a relationship among the one or more fields and input to the one or more operations; wherein generating the instructions for performing the one or more operations on the one or more fields of the data structure includes: generating, at least partly based on the translation, the instructions for accessing the one or more fields of the data structure, and the mapping, the instructions in accordance with the second syntax for performing the one or more operations on the one or more fields of the data structure.

In other implementations, the method includes sending, to a client device that sent the request, the instructions in accordance with the second syntax for performing the one or more operations on the one or more fields of the data structure. In still other implementations, the request includes an identifier for the computing device, and the method further includes: determining, based on comparing the identifier to contents of a mapping of identifiers to types of processes, a type of process implemented by a client device that sent the request.

In some implementations, one or more of the first syntax and the second syntax include a programming language. In other implementations, the programming language includes one or more of the szl programming language, the Java programming language, the C++ programming language, the JavaScript programming language, and the Python programming language.

In still other implementations, the method further includes accessing a mapping of one or more syntaxes to one or more types of processes; and identifying, in the mapping, a syntax for the type of process implemented by the client device. In some implementations, the data structure includes one or more of a protocol buffer, an array, a list, a binary tree, and a graph.

In still another aspect of the disclosure, one or more machine-readable media are configured to store instructions that are executable by one or more processing devices to perform operations including obtaining a definition of a data structure, the definition specifying one or more fields of the data structure; obtaining a definition of one or more operations to be performed on the data structure, the definition of the one or more operations being in accordance with a first syntax; receiving a request for instructions to perform the one or more operations on the one or more fields of the data structure, the instructions being in accordance with a second syntax; generating a translation of the definition of the one or more operations from the first syntax to the second syntax; generating, in accordance with the second syntax based on the definition of the data structure, instructions for accessing the one or more fields of the data structure; and generating, at least partly based on the translation and the instructions for accessing the one or more fields of the data structure, the instructions in accordance with the second syntax for performing the one or more operations on the one or more fields of the data structure. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: obtaining a definition of a data structure, the definition specifying one or more fields of the data structure; obtaining a definition of one or more operations to be performed on the data structure, the definition of the one or more operations being in accordance with a first syntax; receiving a request for instructions to perform the one or more operations on the one or more fields of the data structure, the instructions being in accordance with a second syntax; generating a translation of the definition of the one or more operations from the first syntax to the second syntax; generating, in accordance with the second syntax based on the definition of the data structure, instructions for accessing the one or more fields of the data structure; and generating, at least partly based on the translation and the instructions for accessing the one or more fields of the data structure, the instructions in accordance with the second syntax for performing the one or more operations on the one or more fields of the data structure. Implementations of this aspect of the present disclosure can include one or more of the foregoing features.

In yet another aspect of the disclosure, an electronic system includes means for obtaining a definition of a data structure, the definition specifying one or more fields of the data structure; means for obtaining a definition of one or more operations to be performed on the data structure, the definition of the one or more operations being in accordance with a first syntax; means for receiving a request for instructions to perform the one or more operations on the one or more fields of the data structure, the instructions being in accordance with a second syntax; means for generating a translation of the definition of the one or more operations from the first syntax to the second syntax; means for generating, in accordance with the second syntax based on the definition of the data structure, instructions for accessing the one or more fields of the data structure; and means for generating, at least partly based on the translation and the instructions for accessing the one or more fields of the data structure, the instructions in accordance with the second syntax for performing the one or more operations on the one or more fields of the data structure. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

Figure 1:
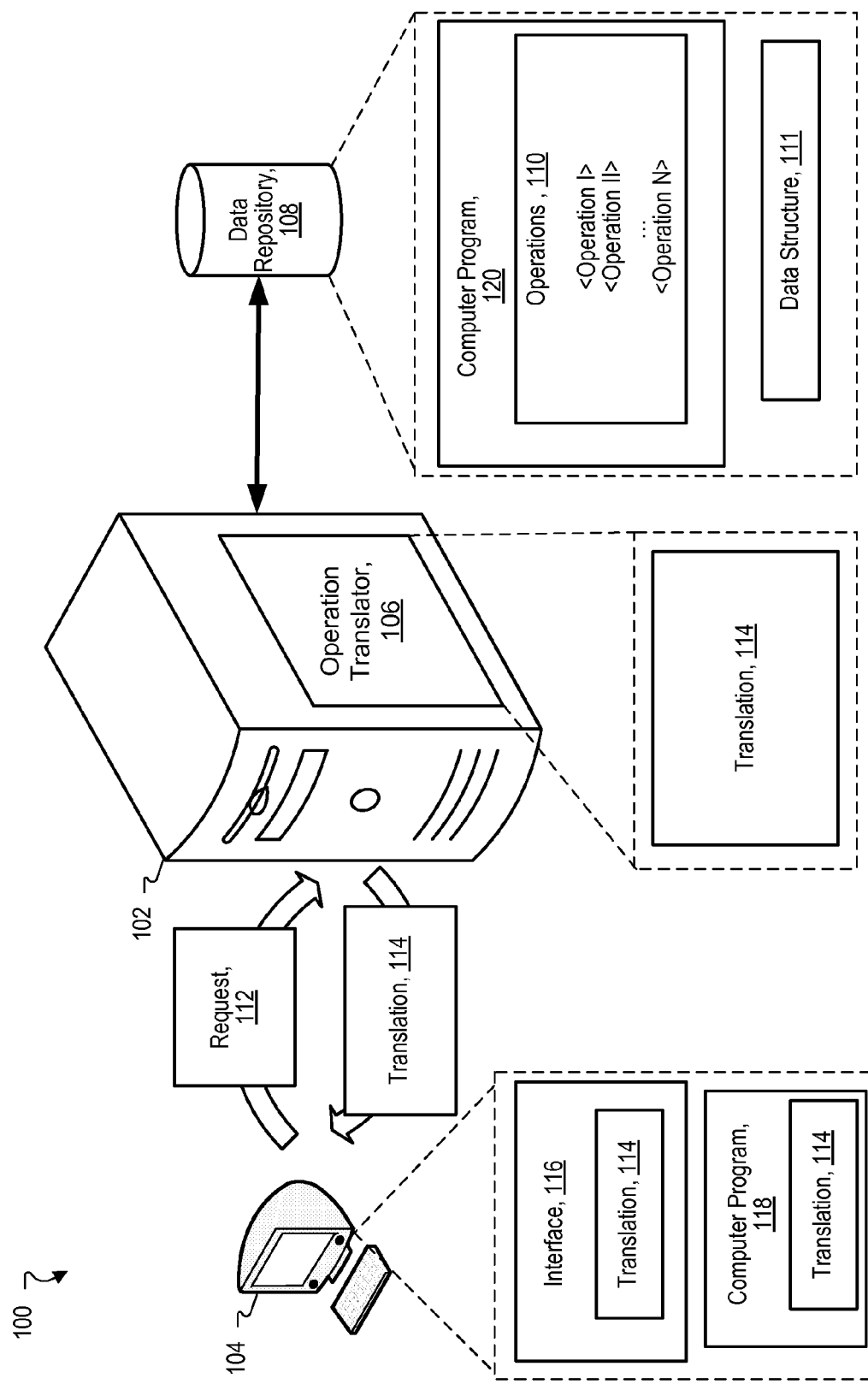
FIG. 1 is a conceptual diagram of an example of a system that generates a translation of operations from one programming language to another programming language.

A system consistent with this disclosure generates a translation of operations to be performed on a data structure. Generally, a data structure includes a pre-defined format for organizing and/or for storing data. A translation includes a conversion of data from one language to another language.

Using the system, developers are able to quickly and easily translate a computer program that implements operations on a data structure from one programming language to another programming language, e.g., rather than manually writing numerous computer programs in different programming languages. In an example, programming languages include the Java programming language, the C++ programming language, the JavaScript® programming language, the Python programming language, the szl programming language, and the like.

For example, a developer defines a data structure. The developer defining the data structure may be referred to as developer A. In this example, developer A writes a computer program, referred to herein as computer program A. Computer program A defines various operations that may be performed on the data structure. Computer program A defining the operations is written in a programming language, which may include any of the foregoing programming languages, and is referred to herein as programming language A.

In this example, another computer program is written by another developer, referred to herein as computer program B and developer B, respectively. For computer program B, developer B uses at least some of the same operations as computer program A. In this example, computer program B is written programming language B, including, e.g., a programming language that differs from programming language A. Programming language B may also include any of the foregoing programming languages.

Rather than re-writing the operations included in computer program A in programming language B and/or manually translating the operations from programming language A to programming language B, the system translates the operations included in computer program A from programming language A to programming language B. Developer B uses, in computer program B, the operations written in programming language B.

In an example, programming language A includes a programming language with an increased level of simplicity, for example, relative to levels of simplicity provided by other programming languages. In this example, programming language A includes the szl programming language.

In this example, the relative simplicity of programming language A promotes an easy translation, by the system, of the operations from programming language A into another programming language. In an example, this increased accuracy in the translation reduces a number of differences in implementation of the operations in different programming languages.

The system also automatically identifies a programming language for implementation of various operations on data structures. Generally, the system identifies a programming language based on numerous attributes of the programming language, including, e.g., a processing speed achieved with the programming language, a processing time achieved with the programming language, an amount of memory usage achieved with the programming language, and the like.

Using the identified programming language, the system generates a translation of the operations from the programming language (e.g., programming language A) used to define the operations to the identified programming language (e.g., programming language B).

In an example, different programming languages are used for different types of processes, including, e.g., an online process, an offline process, a server-side process, a client-side process, and the like. For example, the szl programming language may be used for offline processing, including, e.g., for the processing of information indicative of a website's performance, namely, log information.

In this example, a developer uses the szl programming language to define operations to retrieve log information from a data structure, to process the log information, and to write the processed log information into the data structure. The developer uses the same operations to retrieve and to process a portion of the log information in a server-side process, e.g., at a time of serving the website.

The C++ programming language may be used for a server-side process to decrease processing time, e.g., relative to the processing time provided by the szl programming language. In this example, the same operations are implemented on the data structure in the server-side process and in the offline process. To promote consist implementation of the offline process and the server-side process, the system uses the definition of the operations written for the offline process in generating a translation of the operations for the server-side process.

In an example, the system performs operations on numerous types of data structures, including, protocol buffers, arrays, lists, binary trees, hashes, graphs, and the like. In this example, a protocol buffer includes a data structure that stores data according to a serialization format. Generally, a serialization format includes a definition of how to convert data from an original format into a compressed format for storage. The data stored in the protocol buffer can be restored to its original format by reversely applying the serialization format to decompress the data.

The protocol buffer can include an interface that is based on an interface description language (IDL). Generally, an IDL includes a software language for generating an interface that is programming language-neutral. The IDL promotes communication between two computer programs that can be written in different programming languages, for example, between a computer program written in the C++ programming language and a computer program written in the Java programming language.

Through an IDL-based interface, the protocol buffer can be accessed by computer programs written in different programming languages. The system can translate these computer programs, and the operations included therein, from one programming language to another programming language.

FIG. 1 is a conceptual diagram of an example of system 100 that generates translation 114 of operations 110 to be performed on data structure 111. System 100 includes server 102. Server 102 includes operation translator 106. Operation translator 106 is configured to translate computer program 120 defining operations from one programming language to another programming language. System 100 also includes data repository 108 that stores computer program 120 and data structure 111.

In an example, operations 110 include a definition of the operations to be performed on data structure 111. Generally, a definition of an operation includes a statement specifying one or more actions to be performed on one or more items of data. Operations 110, include numerous, different operations, including, e.g., operation I, operation II . . . operation N. In this example, operations 110 include operations to read data from a field in data structure 111, to perform calculations on the data, and to write the data resulting from the calculation to another field in data structure 111.

In the example of FIG. 1, operations 110 are written in a first syntax, including, e.g., programming language A. Generally, a syntax includes rules governing the formation of statements in a programming language.

System 100 also includes client device 104. Client device 104 includes interface 116 to operation translator 106. In an example, interface 116 includes a graphical user interface through which a user of client device 104 may interact with operation translator 106.

Client device 104 also includes computer program 118. Computer program 118 is written in a programming language that differs from the programming language used in computer program 120 to define operations 110. In this example, another syntax (e.g., programming language B) is used in computer program 118.

In an example, the user of client device 104 wants computer program 118 to perform operations 110 on data structure 111. Prior to including operations 110 in computer program 118, the user needs to translate operations 110 from programming language A into programming language B. In this example, the user accesses interface 116. Through interface 116, the user generates request 112 for translation 114 of operations 110 into programming language B.

As described in further detail below, request 112 may also include a request for instructions to perform one or more operations on fields of data structure 111. In this example, the request 112 includes a request for translation 114 and also a request for instructions for accessing the fields of data structure 111, e.g., instructions to read/write data to and from the fields of data structure 111 (and/or another data structure).

In a variation of FIG. 1, interface 116 may be included in computer program 118. In this example, interface 116 may be included in a toolbar, a selectable button, and/or other interfacing element that is included in the user interface of computer program 118.

In the example of FIG. 1, request 112 includes information specifying that translation 114 is a translation of operations 110 from one syntax to another syntax (e.g., from programming language A to programming language B). In another example, request 112 includes a request for translation 114 of operations 110, e.g., without specifying the programming language to be used for translation 114. In still another example, request 112 includes a request for instructions in accordance with a specified syntax (e.g., programming language B).

In this example, operation translator 106 determines a programming language in which to write translation 114. Request 112 includes an identifier (not shown) for client device 104. Generally, an identifier includes information characterizing an entity. In this example, operation translator 106 uses the identifier to determine a type of process performed by client device 104, including, e.g., an offline process, an online process, a client-side process, a server-side process, and the like. Operation translator 106 identifies a programming language for the types of processes performed by client device 104, e.g., using the above described attributes of programming languages. In the example of FIG. 1, operation translator 106 receives request 112.

In response, operation translator 106 retrieves computer program 120 with operations 110 from data repository 108. In this example, operation translator 106 generates translation 114 of operations 110. Translation 114 of operations 110 is in a programming language specified in request 112 and/or in a programming language determined by operation translator 106.

Operation translator 106 also generates instructions for accessing the one or more fields of data structure 111. In generating the instructions for accessing, operation translator 106 uses the definition of data structure 111, e.g., to identify the fields in data structure 111.

In this example, request 112 may include data specifying which fields of which data structures data is read from and which fields of which data structures data is written to, e.g., following performance of operations. Operation translator 106 generates the instructions to access the specified fields in the specified data structures.

The instructions for accessing include instructions to read data from the field of data structure 111 and/or to write data to the fields of data structure 111. Operation translator 106 generates the instructions for accessing to promote efficient programming, e.g., by reducing a need of a user of client device 104 to have to write basic functionality, including, e.g., instructions to read and/or to write data to the fields of data structure 111. The instructions for accessing are written in accordance with a syntax specified in request 112 and/or in a syntax determined by operation translator 106.

Operation translator 106 generates instructions to perform operations on one or more fields of data structure 111. In an example, these instructions specify the reading of data from fields in data structure 111, the performance of one or more operations on the data, and the writing of the data on which the operations were performed to fields in data structure 111 (and/or to another data structure). Operation translator 106 generates the instructions using translation 114 and the instructions for accessing the one or more fields of data structure 111. These instructions are in accordance in accordance with a syntax specified in request 112 and/or in a syntax determined by operation translator 106. Operation translator 106 may send the instructions to client device 104, e.g., in response to request 112.

Although FIG. 1 depicts various elements, system 100 can include fewer or more elements than what is shown, and functionality of the depicted elements can overlap and/or exist in fewer or more elements.

Figure 2:
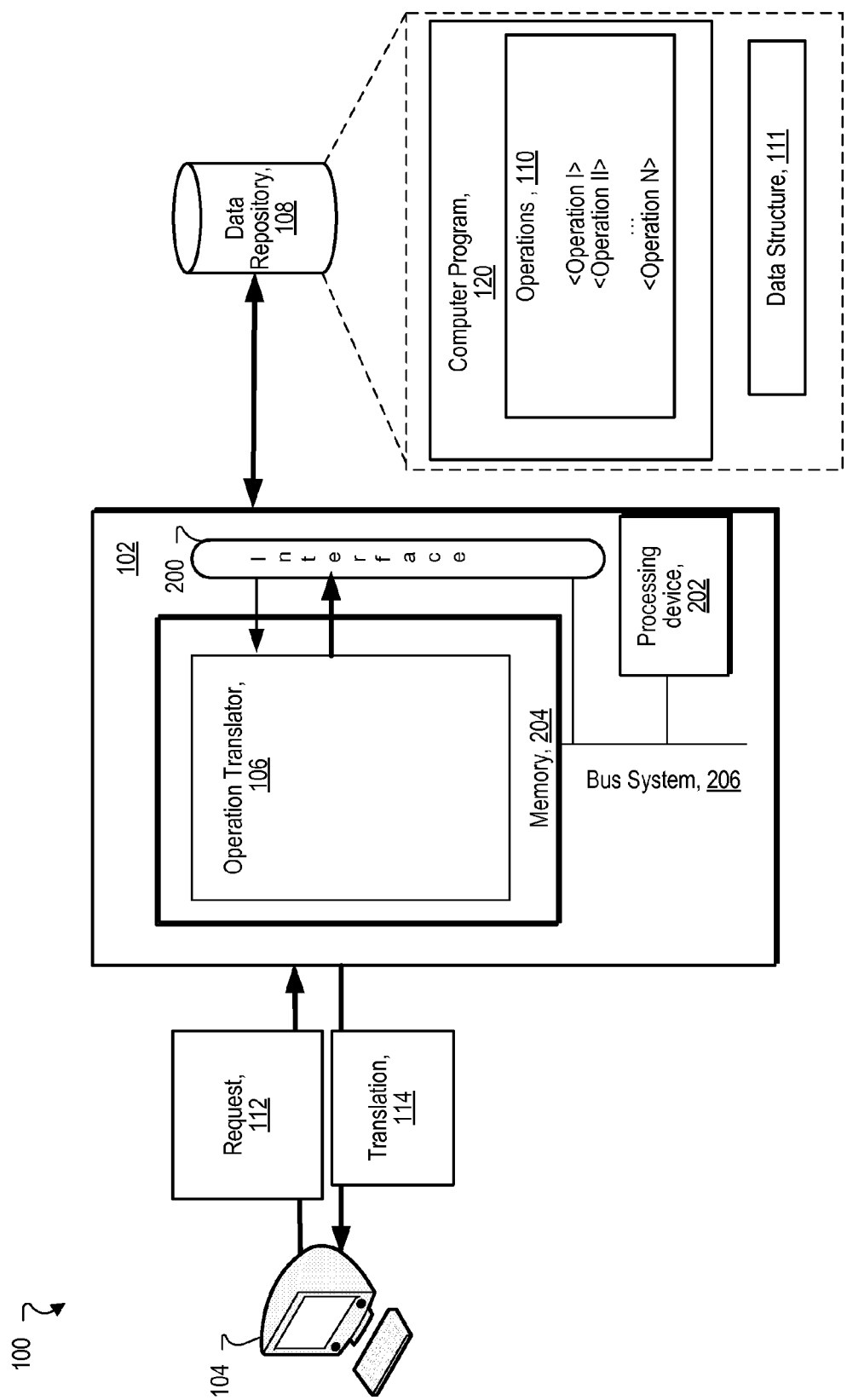
FIG. 2 is a block diagram showing examples of components of a system that generates a translation of operations from one programming language to another programming language.

FIG. 2 is a block diagram of example components of system 100 that generates translation 114 of operations 110. In the example of FIG. 2, interface 116 and computer program 118 are not shown.

Client device 104 can be any computing device capable of taking input from a user and communicating over a network (not shown) with server 102 and/or with other client devices. For example, client device 104 can be a mobile device, a desktop computer, a laptop, a cell phone, a personal digital assistant (PDA), a server, an embedded computing system, a mobile device, and the like. Although a single client device 104 is shown in FIGS. 1 and 2, system 100 can include a plurality of client devices, which can be geographically dispersed.

Server 102 can be any of a variety of computing devices capable of receiving information and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations. Client device 104 and server 102 can run programs having a client-server relationship to each other. Although distinct modules are shown in the figures, in some examples, client and server programs can run on the same device.

Server 102 can receive information from client device 104 via input/output (I/O) interface 200. I/O interface 200 can be any type of interface capable of receiving information over a network, such as an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors. Generally, processing device 202 can include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. These computer programs include operation translator 106.

In an example, request 112 does not include information specifying a programming language for translation 114. In this example, operation translator 106 identifies a programming language for execution of operations 110 on client device 104. In an example, the identified programming language corresponds to the programming language used in computer program 118.

In an example, request 112 includes an identifier (not shown) for client device 104. In this example, an identifier includes an internet protocol (IP) address, a media access control (MAC) address, and the like.

Operation translator 106 uses the identifier to identify the type of process performed by client device 104. To identify the type of process performed by client device 104, operation translator 106 uses a mapping of identifiers to types of processes, as shown in the below Table 1. Generally, a mapping includes information specifying a relationship among items of data.

TABLE 1

| Entry Number | Identifier | Type of Process |
| --- | --- | --- |
| 1 | 10.1.1.35 | Offline |
| 2 | 10.1.1.36 | Online |
| 3 | 10.1.1.37 | Client-side |
| 4 | 10.1.1.38 | Server-side |

Table 1 includes four entries mapping identifiers of client devices to types of processes, including, e.g., an offline process, an online process, a client-side process, and a server-side process. In Table 1, the identifiers for client devices include IP addresses.

In an example, operation translator 106 generates the mapping illustrated in the above Table 1 using information sent to operation translator 106 from client devices, e.g., client device 104. In an example, client device 104 registers with operation translator 106, for example, by sending operation translator 106 information specifying an identifier for client device 104 and a type of process performed by client device 104.

Following identification of a type of process performed by client device 104, operation translator 106 identifies a programming language for execution of the type of process. To identify a programming language, operation translator 106 accesses of mapping of programming languages to types of processes, an example of which is provided in the below Table 2.

TABLE 2

| Type of Process | Syntax (e.g., Programming Language) |
| --- | --- |
| Offline | szl |
| Online | Java |
| Client-side | JavaScript ® |
| Server-side | C++ |

In this example, operation translator 106 identifies the szl programming language for an offline process, e.g., to promote access to log information. Operation translator 106 identifies the Java programming language for an online process, e.g., to promote performance in memory usage and processing speed for processes with low computational requirements. Operation translator 106 identifies the JavaScript® programming language for a client-side process, e.g., when the process is accessed through a web browser. Operation translator 106 identifies the C++ programming language for a server-side process, e.g., to promote performance in memory usage and processing speed for processes with high computational requirements.

In an example, request 112 does not include information specifying a programming language for translation 114. In this example, request 112 includes information specifying an identifier of client device 104. The identifier included in request 112 is an IP address of 10.1.1.35. In this example, operation translator 106 accesses the mapping of identifiers to types of processes, e.g., as shown in the above Table 1.

Operation translator 106 determines a match between the IP address of client device 104 and the value of the identifier in entry number one of Table 1. In this example, entry number one of Table 1 maps an IP address of 10.1.1.35 to an offline process. Using the mapping, operation translator 106 determines that client device 104 performs an offline process.

In this example, operation translator 106 also identifies a programming language for the offline process performed by client device 104. Operation translator 106 accesses contents of the mapping illustrated in the above Table 2. Using contents of the mapping illustrated in the above Table 2, operation translator 106 identifies the szl programming language for offline processing. Operation translator 106 generates translation 114 by translating operations 110 from the programming language used in computer program 120 (e.g., programming language A) into the szl programming language.

In still another example, another client device (not shown) performs a server-side process. Using contents of the mapping of types of processes to programming languages, operation translator 106 identifies the Java programming language for a server-side process. Operation translator 106 generates a translation of operation 110 from the programming language used in computer program 120 to the Java programming language.

Operation translator 106 can be implemented in software running on a computer device (e.g., server 102), hardware or a combination of software and hardware. Although operation translator 106 is shown as a single module in FIGS. 1 and 2, operation translator 106 can exist in one or more modules, which can be distributed and coupled by one or more networks (not shown.

Figure 3:
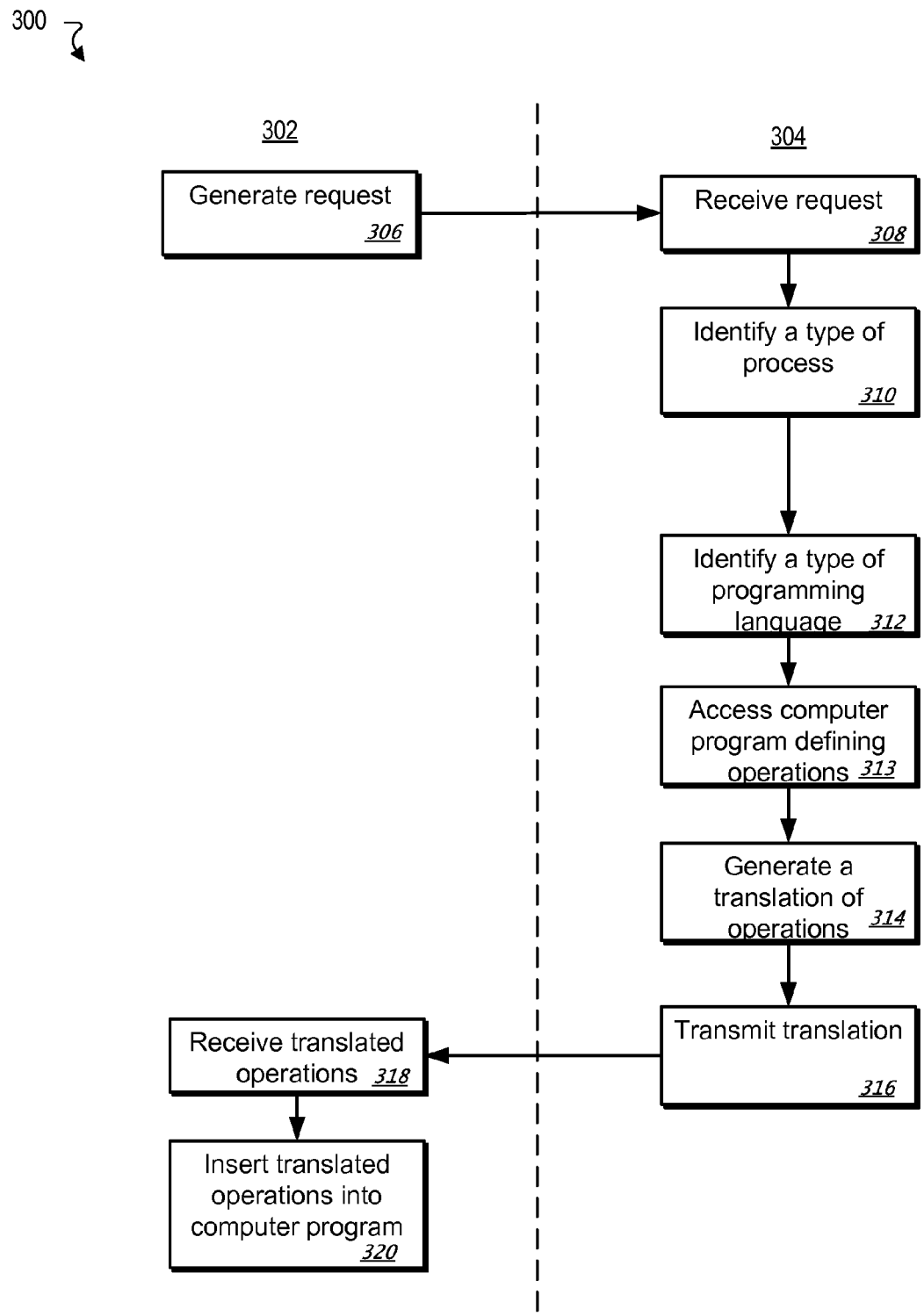
FIG. 3 is a flow chart of an example process that generates a translation of operations from one programming language to another programming language.

FIG. 3 is a flow chart of an example process 300 for generating translation 114 of operations 110. In FIG. 3, process 300 is split into a left part 302, which is performed on client device 104, and a right part 304, which is performed on server 102.

In operation, client device 104 generates (306) request 112. Server 102 receives (308) request 112. In response, operation translator 106 identifies (310) a type of process performed by client device 104. In example, operation translator 106 determines the type of process performed by client device 104, e.g., using the identifier included in the request 112 and the mapping shown in the above Table 1.

In this example, using the type of process performed by client device 104, operation translator 106 identifies (312) a programming language for the type of process. In this example, the programming language identified for the type of process implemented by client device 104 includes the programming language used in computer program 118.

Operation translator 106 accesses (313) computer program 120 that defines operation 110. In this example, operation translator 106 generates (314) translation 114 of operations 110 from the programming language used in computer program 120 into the programming language identified for the type of process performed by client device 104.

Operation translator 106 transmits (316) translation 114 to client device 104. Client device 104 receives (318) translation 114. In response, interface 116 sends (not shown) translation 114 to computer program 118. Following receipt of translation 114, computer program 118 inserts (320) translation 114 into computer program 118.

Using the techniques described herein, a system generates a translation of operations for a data structure. In an example, the programming language used for the translation may be determined based on a type of process implemented by a client device requesting the transition. In this example, the system generates the translation in a programming language identified for the type of process implemented by the client device, for example. In another example, the system generates the translation in programming language specified by a user of the system.

Figure 4:
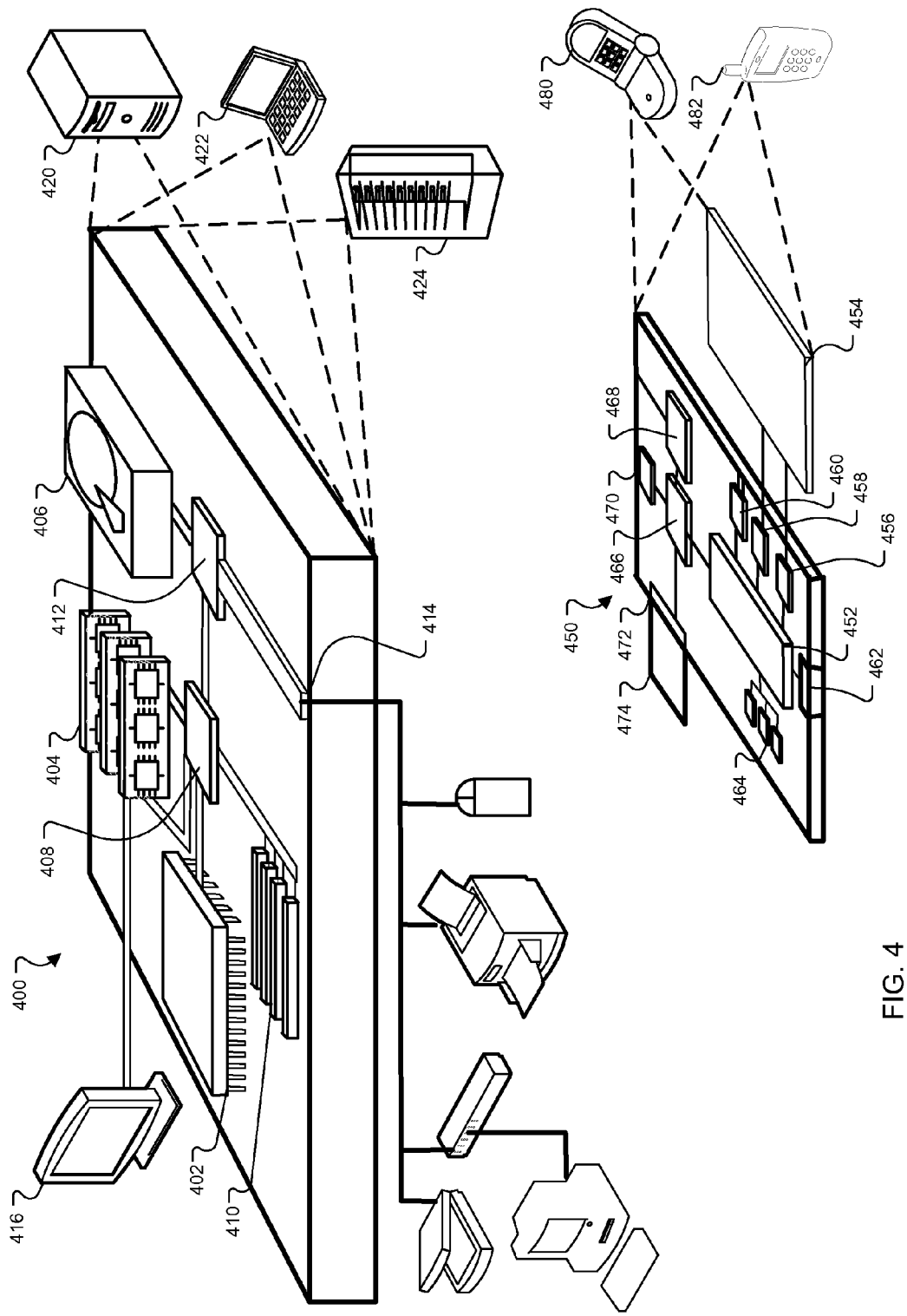
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document. Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores information within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product also can contain instructions that, when executed, perform one or more methods, such as those described above. The information carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations.

Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other information to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores information within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other information for device 450. Specifically, expansion memory 474 can include instructions to carry out or supplement the processes described above, and can include secure information also. Thus, for example, expansion memory 474 can be provide as a security module for device 450, and can be programmed with instructions that permit secure use of device 450. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken information from a user and convert it to usable digital information. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processing devices, comprising:
   obtaining a definition of a data structure, the definition specifying one or more fields of the data structure;
   obtaining a definition of one or more operations to be performed on the data structure, the definition of the one or more operations being in accordance with a first syntax;
   receiving, from a client device, a request to translate (i) instructions to perform the one or more operations in the first syntax on the one or more fields of the data structure, into (ii) instructions to perform the one or more operations in a second syntax on the one or more fields of the data structure;
   in response to the request to translate received from the client device,
      generating a translation of the obtained definition of the one or more operations from the first syntax to the second syntax specified in the request;
      generating, in accordance with the second syntax based on the obtained definition of the data structure, access instructions for accessing the one or more fields of the data structure as defined in the obtained definition in the second syntax specified in the request; and
   at least partly based on the translation of the definition of the one or more operations from the first syntax to the second syntax,
      generating the requested translation for performing in the second syntax specified in the request the one or more operations on the one or more fields of the data structure, with the requested instructions comprising the generated access instructions that are in the second syntax and are for accessing the one or more fields of the data structure.

2. The method of claim 1, further comprising:
   generating, based on the definition of the data structure and the definition of one or more operations, a mapping specifying a relationship among the one or more fields and input to the one or more operations;
   wherein generating the requested instructions for performing the one or more operations on the one or more fields of the data structure comprises:
      generating, at least partly based on the translation, the access instructions for accessing the one or more fields of the data structure, and the mapping, the requested instructions in accordance with the second syntax for performing the one or more operations on the one or more fields of the data structure.

3. The method of claim 1, further comprising:
   sending, to a client device that sent the request, the requested instructions in accordance with the second syntax for performing the one or more operations on the one or more fields of the data structure.

4. The method of claim 1, wherein the request comprises an identifier for a computing device, and wherein the method further comprises:
   determining, based on comparing the identifier to contents of a mapping of identifiers to types of processes, a type of process implemented by a client device that sent the request.

5. The method of claim 1, wherein one or more of the first syntax and the second syntax comprise a programming language.

6. The method of claim 5, wherein the programming language comprises one or more of the szl programming language, the Java programming language, the C++ programming language, the JavaScript programming language, and the Python programming language.

7. The method of claim 4, further comprising:
   accessing a mapping of one or more syntaxes to one or more types of processes; and
   identifying, in the mapping, a syntax for the type of process implemented by the client device.

8. The method of claim 1, wherein the data structure comprises one or more of a protocol buffer, an array, a list, a binary tree, and a graph.

9. One or more machine-readable hardware storage devices storing instructions that are executable by one or more processing devices to perform operations comprising:
   obtaining a definition of a data structure, the definition specifying one or more fields of the data structure;
   obtaining a definition of one or more operations to be performed on the data structure, the definition of the one or more operations being in accordance with a first syntax;

receiving, from a client device, a request to translate (i) instructions to perform the one or more operations in the first syntax on the one or more fields of the data structure, into (ii) instructions to perform the one or more operations in a second syntax on the one or more fields of the data structure;

in response to the request to translate received from the client device, generating a translation of the obtained definition of the one or more operations from the first syntax to the second syntax specified in the request;

generating, in accordance with the second syntax based on the obtained definition of the data structure, access instructions for accessing the one or more fields of the data structure as defined in the obtained definition in the second syntax specified in the request; and at least partly based on the translation of the definition of the one or more operations from the first syntax to the second syntax, generating the requested translation for performing in the second syntax specified in the request the one or more operations on the one or more fields of the data structure, with the requested instructions comprising the generated access instructions that are in the second syntax and are for accessing the one or more fields of the data structure.

10. The one or more machine-readable hardware storage devices of claim 9, wherein the operations further comprise:

generating, based on the definition of the data structure and the definition of one or more operations, a mapping specifying a relationship among the one or more fields and input to the one or more operations;

wherein generating the requested instructions for performing the one or more operations on the one or more fields of the data structure comprises:

generating, at least partly based on the translation, the access instructions for accessing the one or more fields of the data structure, and the mapping, the requested instructions in accordance with the second syntax for performing the one or more operations on the one or more fields of the data structure.

11. The one or more machine-readable hardware storage devices of claim 9, wherein the operations further comprise:

sending, to a client device that sent the request, the requested instructions in accordance with the second syntax for performing the one or more operations on the one or more fields of the data structure.

12. The one or more machine-readable hardware storage devices of claim 9, wherein the request comprises an identifier for a computing device, and wherein the operations further comprise:

determining, based on comparing the identifier to contents of a mapping of identifiers to types of processes, a type of process implemented by a client device that sent the request.

13. The one or more machine-readable hardware storage devices of claim 9, wherein one or more of the first syntax and the second syntax comprise a programming language.

14. The one or more machine-readable hardware storage devices of claim 9, wherein the data structure comprises one or more of a protocol buffer, an array, a list, a binary tree, and a graph.

15. An electronic system comprising:

one or more processing devices; and one or more machine-readable hardware storage devices storing instructions that are executable by the one or more processing devices to perform operations comprising:

obtaining a definition of a data structure, the definition specifying one or more fields of the data structure;

obtaining a definition of one or more operations to be performed on the data structure, the definition of the one or more operations being in accordance with a first syntax;

receiving, from a client device, a request to translate (i) instructions to perform the one or more operations in the first syntax on the one or more fields of the data structure, into (ii) instructions to perform the one or more operations in a second syntax on the one or more fields of the data structure;

in response to the request to translate received from the client device, generating a translation of the obtained definition of the one or more operations from the first syntax to the second syntax specified in the request;

generating, in accordance with the second syntax based on the obtained definition of the data structure, access instructions for accessing the one or more fields of the data structure as defined in the obtained definition in the second syntax specified in the request; and at least partly based on the translation of the definition of the one or more operations from the first syntax to the second syntax, generating the requested translation for performing in the second syntax specified in the request the one or more operations on the one or more fields of the data structure, with the requested instructions comprising the generated access instructions that are in the second syntax and are for accessing the one or more fields of the data structure.

16. The electronic system of claim 15, wherein the operations further comprise:

generating, based on the definition of the data structure and the definition of one or more operations, a mapping specifying a relationship among the one or more fields and input to the one or more operations;

wherein generating the requested instructions for performing the one or more operations on the one or more fields of the data structure comprises:

generating, at least partly based on the translation, the access instructions for accessing the one or more fields of the data structure, and the mapping, the requested instructions in accordance with the second syntax for performing the one or more operations on the one or more fields of the data structure.

17. The electronic system of claim 15, wherein the operations further comprise:

sending, to a client device that sent the request, the requested instructions in accordance with the second syntax for performing the one or more operations on the one or more fields of the data structure.

18. The electronic system of claim 15, wherein the request comprises an identifier for a computing device, and wherein the operations further comprise:

determining, based on comparing the identifier to contents of a mapping of identifiers to types of processes, a type of process implemented by a client device that sent the request.

19. The electronic system of claim 15, wherein one or more of the first syntax and the second syntax comprise a programming language.

20. The electronic system of claim 15, wherein the data structure comprises one or more of a protocol buffer, an array, a list, a binary tree, and a graph.

21. An electronic system comprising:
- means for obtaining a definition of a data structure, the definition specifying one or more fields of the data structure;
- means for obtaining a definition of one or more operations to be performed on the data structure, the definition of the one or more operations being in accordance with a first syntax;
- means for receiving, from a client device, a request to translate (i) instructions to perform the one or more operations in the first syntax on the one or more fields of the data structure, into (ii) instructions to perform the one or more operations in the second syntax on the one or more fields of the data structure;
- in response to the request to translate received from the client device,
  - means for generating a translation of the obtained definition of the one or more operations from the first syntax to the second syntax specified in the request;
  - means for generating, in accordance with the second syntax based on the obtained definition of the data structure, access instructions for accessing the one or more fields of the data structure as defined in the obtained definition in the second syntax specified in the request; and
- at least partly based on the translation of the definition of the one or more operations from the first syntax to the second syntax,
  - means for generating the requested translation for performing in the second syntax specified in the request the one or more operations on the one or more fields of the data structure, with the requested instructions comprising the generated access instructions that are in the second syntax and are for accessing the one or more fields of the data structure.

* * * * *